(12) United States Patent
Guo et al.

(10) Patent No.: US 12,525,206 B2
(45) Date of Patent: Jan. 13, 2026

(54) DISPLAY CONTROL METHOD, DISPLAY CONTROL DEVICE, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Luqiang Guo, Beijing (CN); Shou Li, Beijing (CN); Tianyang Han, Beijing (CN); Yue Ma, Beijing (CN); Xin Wang, Beijing (CN); Xiaoguang Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 232 days.

(21) Appl. No.: 17/904,509

(22) PCT Filed: Aug. 31, 2021

(86) PCT No.: PCT/CN2021/115812
§ 371 (c)(1),
(2) Date: Aug. 18, 2022

(87) PCT Pub. No.: WO2023/028885
PCT Pub. Date: Mar. 9, 2023

(65) Prior Publication Data
US 2024/0194164 A1 Jun. 13, 2024

(51) Int. Cl.
*G09G 5/00* (2006.01)
*G06F 3/048* (2013.01)
(Continued)

(52) U.S. Cl.
CPC .............. *G09G 5/006* (2013.01); *G06F 3/048* (2013.01); *G09G 3/32* (2013.01); *G09G 3/3233* (2013.01);
(Continued)

(58) Field of Classification Search
CPC .............. G09G 3/3688; G09G 2310/08; G09G 2310/0283; G09G 5/006; G09G 2310/04; G06F 3/048
See application file for complete search history.

(56) References Cited

U.S. PATENT DOCUMENTS 7,551,155 B2 6/2009 Fukuda et al.
7,764,258 B2 7/2010 Kitamura et al.
(Continued)

FOREIGN PATENT DOCUMENTS

| CN | 1674067 A | 9/2005 |
|----|-----------|--------|
| CN | 1992874 A | 7/2007 |

(Continued)

OTHER PUBLICATIONS

Zhu et al., "Data Organization of LED Bar Display Panel with Shoot-Through Connection", Dec. 2011, vol. 26 No. 6.
(Continued)

*Primary Examiner* — Yuzhen Shen
(74) *Attorney, Agent, or Firm* — LEASON ELLIS LLP

(57) ABSTRACT

The present disclosure provides a display control method, a display control device, and a display device. The display control method includes performing a first display mode using an input image data. Performing the first display mode includes: rearranging the input image data to obtain a rearranged image data, the input image data including a valid line part for actual display on a display panel and an invalid line part for non-actual display on the display panel, and the rearranged image data including a rearranged valid (Continued)

line part and a rearranged invalid line part corresponding to the valid line part and the invalid line part, respectively; generating a first image display control signal and a first delay control signal corresponding to the rearranged image data; and outputting the rearranged image data, the first image display control signal, and the first delay control signal.

20 Claims, 6 Drawing Sheets

(51) Int. Cl.
  *G09G 3/32* (2016.01)
  *G09G 3/3233* (2016.01)
  *H04N 7/18* (2006.01)
(52) U.S. Cl.
  CPC ....... *H04N 7/18* (2013.01); *G09G 2310/0283* (2013.01); *G09G 2310/08* (2013.01)

(56) References Cited

U.S. PATENT DOCUMENTS

| | | | | |
|---|---|---|---|---|
| 2003/0122773 | A1* | 7/2003 | Washio | G09G 3/3688 345/103 |
| 2004/0051706 | A1* | 3/2004 | Nakano | G09G 3/3666 345/204 |
| 2004/0085275 | A1* | 5/2004 | Sugiyama | G09G 3/006 345/87 |
| 2008/0079680 | A1 | 4/2008 | Fujita | |
| 2008/0155466 | A1 | 6/2008 | Lee | |
| 2011/0187730 | A1* | 8/2011 | Jun | G09G 5/36 345/545 |
| 2014/0085430 | A1* | 3/2014 | Komori | H04N 23/667 348/47 |

FOREIGN PATENT DOCUMENTS

| | | | | |
|---|---|---|---|---|
| CN | 101101595 | A | | 1/2008 |
| CN | 101154004 | A * | 4/2008 | G09G 3/3688 |
| CN | 101661737 | A | | 3/2010 |
| CN | 101945168 | A | | 1/2011 |
| CN | 104683721 | A | | 6/2015 |
| CN | 104916247 | A | | 9/2015 |
| CN | 105139788 | A | | 12/2015 |
| CN | 107274849 | A | | 10/2017 |
| CN | 109920364 | A | | 6/2019 |
| JP | 2005309274 | A | | 11/2005 |

OTHER PUBLICATIONS

Yin et al., "LED Matrix Display Control System Design Based on Single Chip Microcomputer", Apr. 2008, vol. 30 No. 2.

* cited by examiner

DISPLAY CONTROL METHOD, DISPLAY CONTROL DEVICE, AND DISPLAY DEVICE

CROSS-REFERENCE TO RELATED PATENT APPLICATIONS

This application is a U.S. National Stage Application under 35 U.S.C. § 371 of International Patent Application No. PCT/CN2021/115812 filed Aug. 31, 2021, which is incorporated by reference in its entirety.

TECHNICAL FIELD

The present disclosure relates to a display control method, a display control device, and a display device.

BACKGROUND

At present, with the development of such as outdoor or indoor advertising services, a large number of screens are widely used, and strip-shaped screens are widely used as a kind of advertising display screens. In addition, the used scenarios of screens become rich, and diversified screen forms such as splicing screens, electronic whiteboards, reflective displays, and the like are gradually emerging.

SUMMARY

At least some embodiments of that present disclosure provide a display control method, and the display control method comprises performing a first display mode using an input image data. The first display mode comprises: rearranging the input image data to obtain a rearranged image data, the input image data comprises a valid line part for actual display on a display panel and an invalid line part for non-actual display on the display panel, and the rearranged image data comprises a rearranged valid line part and a rearranged invalid line part corresponding to the valid line part and the invalid line part, respectively; generating a first image display control signal and a first delay control signal corresponding to the rearranged image data; and outputting the rearranged image data, the first image display control signal and the first delay control signal for performing a display operation on the display panel. The first image display control signal is configured to perform a frame display corresponding to the rearranged image data during the display operation, and the first delay control signal is configured to trigger a line scanning process for the rearranged valid line part in the display panel during a process of the frame display.

For example, in the display control method provided by at least some embodiments of the present disclosure, the rearranging the input image data to obtain the rearranged image data comprises performing an overall inversion rearrangement operation on the input image data to obtain the rearranged image data. The first delay control signal is obtained according to a position of the rearranged valid line part in the rearranged image data, or the first delay control signal is obtained by presetting.

For example, the display control method provided by at least some embodiments of the present disclosure further comprises: acquiring a display control instruction; and selecting to perform the first display mode or to perform a second display mode in response to the display control instruction. The second display mode is different from the first display mode.

For example, in the display control method provided by at least some embodiments of the present disclosure, the second display mode comprises: generating a second image display control signal corresponding to the input image data, in which the second image display control signal is configured to perform a frame display corresponding to the input image data during the display operation; and outputting the input image data and the second image display control signal for performing the display operation on the display panel.

For example, in the display control method provided by at least some embodiments of the present disclosure, the acquiring the display control instruction comprises: reading an input port of a display system to which the display panel belongs; and acquiring the display control instruction according to different states of the input port.

For example, in the display control method provided by at least some embodiments of the present disclosure, the display system comprises a first executable code corresponding to the first display mode and a second executable code corresponding to the second display mode. The selecting to perform the first display mode or to perform the second display mode in response to the display control instruction comprises: selecting to execute the first executable code or the second executable code according to the display control instruction.

For example, in the display control method provided by at least some embodiments of the present disclosure, in the first display mode, the display panel is in an inverted state; and in the second display mode, the display panel is in an upright state relative to the inverted state, and the upright state is opposite to the inverted state.

For example, in the display control method provided by at least some embodiments of the present disclosure, the display panel comprises a gate driving circuit for implementing the line scanning process, and the first delay control signal is configured to generate a scan start signal of the gate driving circuit.

For example, the display control method provided by at least some embodiments of the present disclosure further comprises: receiving and storing the input image data.

At least some embodiments of that present disclosure provide a display control device, the display control device comprises an image processing module, a timing generation module, a delay processing module, and an output circuit. The image processing module is configured to rearrange an input image data received to obtain a rearranged image data, the input image data comprises a valid line part for actual display on a display panel and an invalid line part for non-actual display on the display panel, and the rearranged image data comprises a rearranged valid line part and a rearranged invalid line part corresponding to the valid line part and the invalid line part respectively; the timing generation module is configured to generate a first image display control signal corresponding to the rearranged image data, and the first image display control signal is configured to perform a frame display corresponding to the rearranged image data during the display operation; the delay processing module is configured to generate a first delay control signal corresponding to the rearranged image data, and the first delay control signal is configured to trigger a line scanning process for the rearranged valid line part in the display panel during a process of the frame display; and the output circuit is configured to output the rearranged image data, the first image display control signal and the first delay control signal for performing a display operation on the display panel.

For example, in the display control method provided by at least some embodiments of the present disclosure, the image processing module comprises an image data rearrangement circuit, and the image data rearrangement circuit is configured to perform an overall inversion rearrangement operation on the input image data to obtain the rearranged image data.

For example, in the display control method provided by at least some embodiments of the present disclosure, the first delay control signal is obtained according to a position of the rearranged valid line part in the rearranged image data, or the first delay control signal is obtained by presetting.

For example, in the display control method provided by at least some embodiments of the present disclosure, the delay processing module comprises a gate signal timing adjustment module. The gate signal timing adjustment module is configured to set the first delay control signal later than the first image display control signal by a predetermined time, and the predetermined time is obtained according to the position of the rearranged valid line part in the rearranged image data, or the predetermined time is obtained by the presetting.

For example, the display control method provided by at least some embodiments of the present disclosure further comprises a control device, and the control device is configured to select to perform a first display mode or to perform a second display mode in response to a display control instruction. The second display mode is different from the first display mode, and the first display mode comprises performing the display operation on the display panel using the rearranged image data, the image display control signal and the first delay control signal.

For example, in the display control method provided by at least some embodiments of the present disclosure, the timing generation module is further configured to generate a second image display control signal corresponding to the input image data, and the second image display control signal is configured to perform a frame display corresponding to the input image data during the display operation; the second display mode comprises performing the display operation on the display panel using the input image data and the image display control signal; and the output circuit is further configured to output the input image data and the second image display control signal for performing a display operation of the second display mode on the display panel.

For example, the display control method provided by at least some embodiments of the present disclosure further comprises a second storage device. The second storage device is configured to store a first executable code corresponding to the first display mode and a second executable code corresponding to the second display mode, and the display control device is further configured to select to execute the first executable code or the second executable code according to the display control instruction in response to the display control instruction.

For example, the display control method provided by at least some embodiments of the present disclosure further comprises an input port, and the input port is configured to acquire the display control instruction according to different states of the input port.

For example, the display control method provided by at least some embodiments of the present disclosure further comprises a first storage device, and the first storage device is configured to store the input image data received.

At least some embodiments of that present disclosure further provide a display device, and the display device comprises the display control device according to any one of the embodiments of the present disclosure and a display panel.

For example, in the display device provided by at least some embodiments of the present disclosure, the display panel comprises a gate driving circuit, a data driving circuit and a pixel array. The gate driving circuit is configured to receive a scan control signal to scan the pixel array; the data driving circuit is configured to receive an image data signal and provide the image data signal to the pixel array; and the pixel array is configured to receive the image data from the data driving circuit to perform the display operation under the control of the gate driving circuit, the first image display control signal comprises the scan control signal, and the image data signal comprises the rearranged image data.

BRIEF DESCRIPTION OF THE DRAWINGS

In order to clearly illustrate the technical solutions of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

Figure 1:
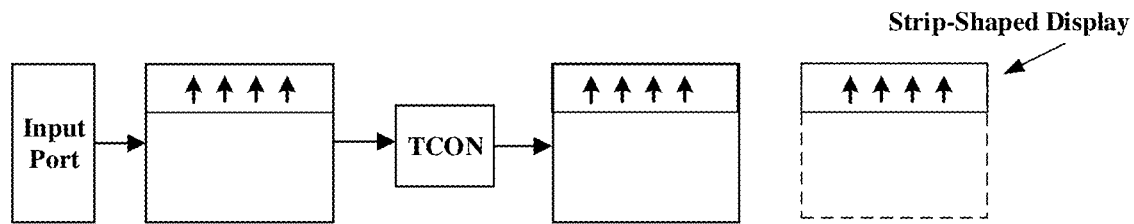
FIG. 1 is a schematic diagram of a display process of a strip-shaped display.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," "the," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The present disclosure is described below through several specific embodiments. To keep the following description of the embodiments of the present disclosure clear and concise, detailed descriptions of well-known functions and well-known components (elements) may be omitted. When any component (element) of an embodiment of the present disclosure appears in more than one drawing, the component (element) is denoted by the same or similar reference numeral in each drawing.

Under the current display driving method, the input image data for a strip-shaped display (or display screen) is usually still in a full-frame format. The full-frame format includes, for example, standard definition (480*320, 640*480), high definition (1024*720p, 1920*1080i), full high definition (1920*1080p), ultra high definition (3840*2160, 7680*4320), and the like.

FIG. 1 is a schematic diagram of a display process of a strip-shaped display. As shown in FIG. 1, the input image data input to the strip-shape display may be acquired from a storage device (such as a hard disk) or received from a receiving device (such as a modem). For example, the input image data may be 1920*1080 in size. The resolution of the strip-shaped display is, for example, 1920*360, and the strip-shaped display includes a timing controller (TCON). The size of the input image data in the column direction (that is, the number of rows) is larger than the size of the image actually displayed by the strip-shaped display in the column direction, so only a part of the input image data is displayed on the strip-shaped display, this part is called a valid line part, and the rest is an invalid line part. However, it should be noted that the "invalid line part" may also have substantial image content, which is not limited by the embodiments of the present disclosure. For example, the invalid line part is a valid line part for display on another display panel. For example, for a splicing screen, different valid line parts are spliced into a complete image on the splicing screen. For the display panel of one splicing unit of the splicing screen, the corresponding invalid part is the valid part of the display panel of another splicing unit.

For example, the timing controller corresponds to the input image data, and is configured to generate a timing control signal for controlling the display panel to display according to the input image data. The TCON supplies the input image data and the generated timing control signal to the strip-shaped display, which is performed to display according to the timing control signal and the input image data. For example, the first 360 lines of the input image data are valid line part (indicated by the upward arrow in the figure), which are displayed normally by the strip-shaped display, while the remaining invalid line part from line 361 to line 1080 (720 lines in total) are not displayed on the strip-shaped display (shown in dashed lines in the figure). In addition, the timing control signal corresponding to the invalid line part does not actually drive the strip-shaped display, and within the corresponding time period, the strip-shaped display is not refreshed but keeps displaying the image corresponding to the valid line part mentioned above.

Figure 2:
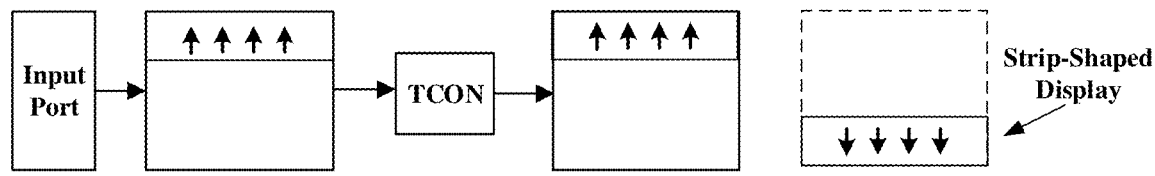
FIG. 2 is a schematic diagram of a display process of an inverted strip-shaped display.

FIG. 2 is a schematic diagram of a display process of an inverted strip-shaped display. Compared with FIG. 1, the difference in FIG. 2 is only that the strip-shaped display is placed upside down, for example, the strip-shaped display is inadvertently inverted during the installation process, or in some application scenarios, the strip-shaped display is required to be inverted intentionally. For example, the scanning direction of the gate signal of the gate driver of the strip-shaped display is fixed. If the strip-shaped display is used upside down, the picture displayed on the strip-shaped display will be inverted, as shown in FIG. 2. In this case, if the inverted image data is input in the above-mentioned strip-shaped display, the invalid line part of the original input image data to be displayed on the strip-shaped display cannot be displayed normally.

Figure 3:
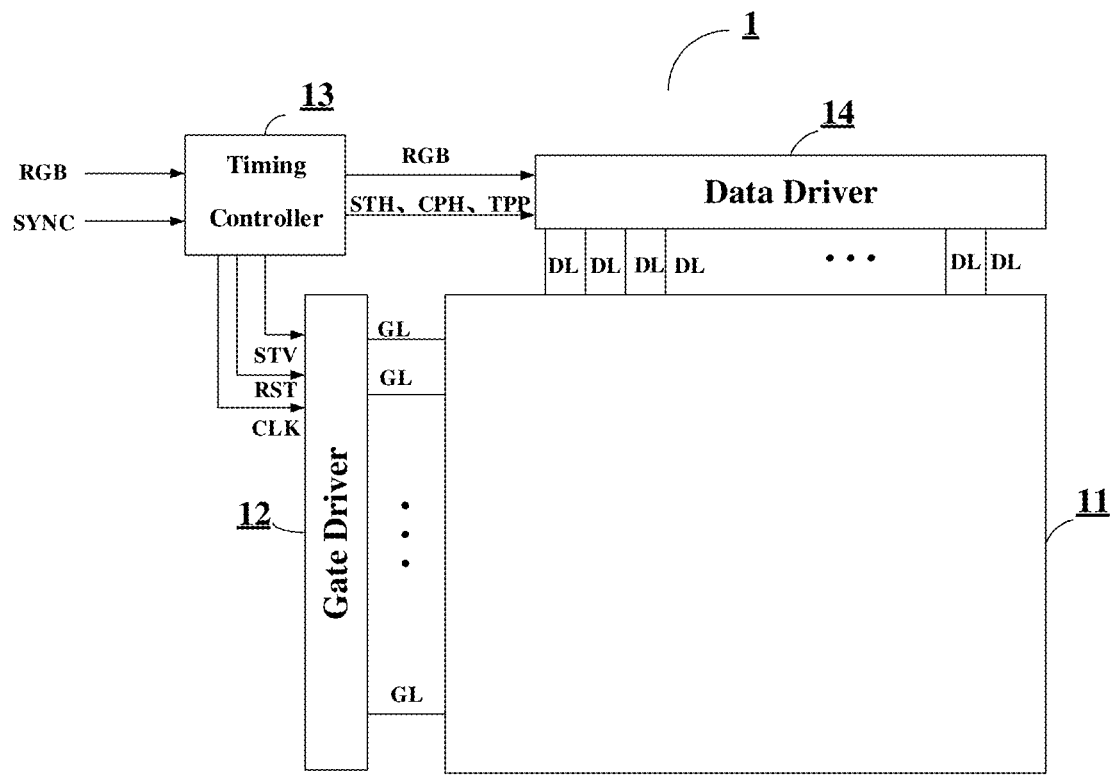
FIG. 3 is a schematic diagram of a structure of a display panel device.

FIG. 3 is a schematic diagram of a structure of a display panel device. For example, the display panel in the strip-shaped display in FIG. 1 or FIG. 2 is shown in FIG. 3. As shown in FIG. 3, the display panel device 1 includes an array substrate 11, a gate driver 12, a timing controller 13, and a data driver 14, and the array substrate 11 is electrically connected to the gate driver 12, the timing controller 13, and the data driver 14. The array substrate 11 includes a pixel array, the pixel array includes rows and columns of pixel units, and each pixel unit is configured to realize the display of one sub-pixel. The array substrate 11 further includes a plurality of scan lines GL and a plurality of data lines DL, the plurality of scan lines GL respectively provide gate signals for the rows of pixel units, and the plurality of data lines DL respectively provide data signals for the columns of pixel units. The gate driver 12 is connected to the plurality of scan lines GL for providing gate scanning signal to drive the plurality of scan lines GL. The data driver 14 is connected to the plurality of data lines DL for providing data signals to drive the plurality of data lines DL. The timing controller 13 is configured to process an image data RGB input from the outside of the display panel device 1, to provide a processed image data RGB, a line data start signal (STH), a data clock signal (CPH), or a data output signal (TP) to the data driver 14, and to output a frame start trigger signal STV, one or more clock signals CLK, a reset signal RST, etc., to the gate driver 12 and the data driver 14, so as to control the gate driver 12 and the data driver 14, so that the pixel array can display the image data RGB progressively or interlaced by, for example, progressive or interlacing scanning.

Figure 4:
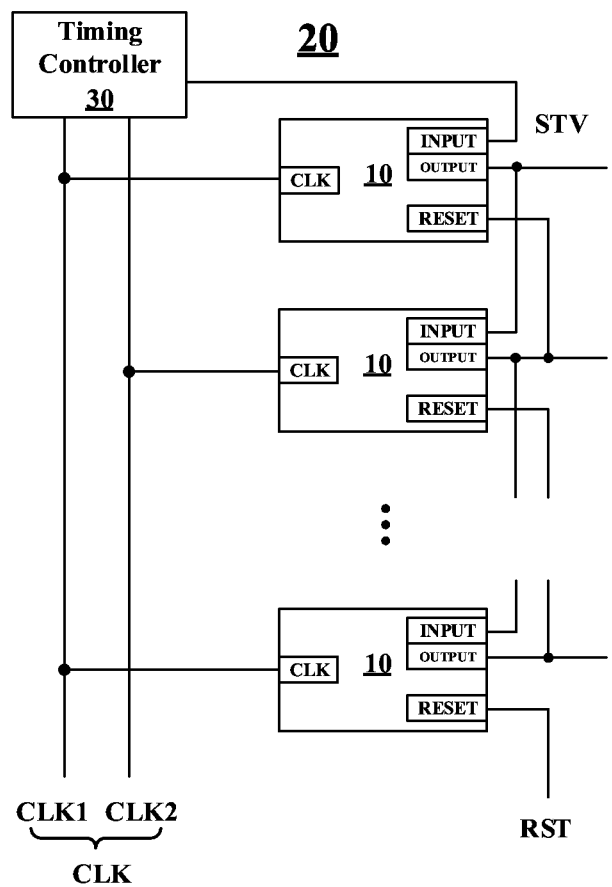
FIG. 4 is a schematic diagram of a gate driving circuit.

FIG. 4 is a schematic diagram of a gate driving circuit. The gate driver 12 in FIG. 3 may be implemented as the gate driving circuit shown in FIG. 4, but is not limited to this gate driving circuit, and may also be other types of gate driving circuits.

As shown in FIG. 4, the gate driving circuit 20 includes a plurality of cascaded shift register units 10. As shown in FIG. 4, except the shift register unit of the first stage, the input terminals INPUTs of the shift register units of the other stages are connected to the first output terminals OUTPUTs of the shift register units of the previous stage. Except the shift register unit of the last stage, the reset terminals RESETs of the shift register units of the other stages are connected to the first output terminals OUTPUTs of the shift register units of the next stage. For example, the input terminal INPUT of the shift register unit of the first stage is configured to receive the trigger signal STV, and the reset terminal RESET of the shift register unit of the last stage is configured to receive the reset signal RST.

As shown in FIG. 4, the shift register units of respective stages are configured to output corresponding gate scanning signals in response to the clock signal CLK. The clock signal CLK for example includes different clock signals CLK1 and CLK2. The timing controller 30 is configured to provide one or more clock signals CLK to the shift register units of respective stages, and the timing controller 30 is further configured to provide the trigger signal STV and the reset signal RST. In FIG. 4, the timing controller 30 provides two different clock signals to shift register units of respective stages through two clock signal lines. In other cases, the timing controller 30 is also configured to provide four different clock signals to shift register units of respective stages through four clock signal lines, etc., which are not limited in the embodiments of the present disclosure.

Figure 5A:
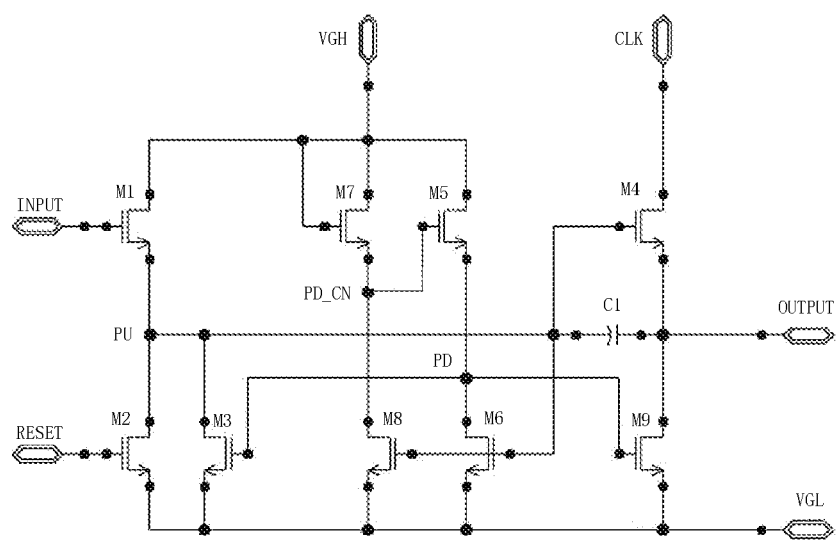
FIG. 5A is a schematic diagram of a structure of a shift register.

FIG. 5A shows a circuit structure of an exemplary shift register unit. The shift register units of respective stages in the gate driving circuit shown in FIG. 4 may be respectively implemented as the shift register unit circuit shown in FIG. 5A, but are not limited to the structure shown in FIG. 5A, and may also be other types of circuit structures, which are not limited in the embodiments of the present disclosure.

As shown in FIG. 5A, the shift register unit includes an input circuit, a pull-up node reset circuit, an output circuit, a pull-down circuit, a pull-down control circuit, and an output reset circuit.

The input circuit includes a first transistor M1, a gate electrode of the first transistor M1 is connected to an input terminal INPUT of the shift register unit, a first electrode of M1 is connected to a first voltage terminal VGH (e.g., input a high level), and a second electrode of M1 is connected to a pull-up node PU.

The pull-up node reset circuit includes a second transistor M2 and a third transistor M3, a gate electrode of the second transistor M2 is connected to a reset terminal of the shift register unit, a first electrode of M2 is connected to the pull-up node PU, and a second electrode is connected to a second voltage terminal VGL (e.g., input a low level). A gate electrode of the third transistor M3 is connected to a pull-down node PD, a first electrode of M3 is connected to the pull-up node PU, and a second electrode is connected to the second voltage terminal VGL.

The output circuit includes a fourth transistor M4 and a storage capacitor C1. A gate electrode of the fourth transistor M4 is connected to the pull-up node PU, a first electrode of M4 is connected to a clock signal terminal CLK, and a second electrode of M4 is connected to a first output terminal OUTPUT of the shift register unit. The storage capacitor C1 is connected in parallel between the gate electrode of M4 and the second electrode of the fourth transistor M4.

The pull-down circuit includes a fifth transistor M5 and a sixth transistor M6, a gate electrode of the fifth transistor M5 is connected to a first pull-down control node PD_CN, a first electrode of M5 is connected to the first voltage terminal VGH, and a second electrode of M5 is connected to the pull-down node PD. A gate electrode of the sixth transistor M6 is connected to the pull-up node PU, a first electrode of M6 is connected to the pull-down node PD, and a second electrode of M6 is connected to the second voltage terminal VGL.

The pull-down control circuit includes a seventh transistor M7 and an eighth transistor M8, a gate electrode of the seventh transistor M7 is connected to a first electrode of M7 and the first voltage terminal VGH, and a second electrode of the seventh transistor M7 is connected to the first pull-down control node PD_CN. A gate electrode of the transistor M8 is connected to the pull-up node PU, a first electrode of M8 is connected to the first pull-down control node PD_CN, and a second electrode of M8 is connected to the second voltage terminal VGL.

The output reset circuit includes a ninth transistor M9, a gate electrode of the ninth transistor M9 is connected to the pull-down node PD, a first electrode of M9 is connected to the first output terminal OUTPUT, and a second electrode of M9 is connected to the second voltage terminal VGL.

For example, the above-mentioned transistors are all N-type transistors, but the embodiments of the present disclosure are not limited to this case.

The operation principle of the shift register unit shown in FIG. 5A is described below with reference to the exemplary signal timing shown in FIG. 5B. In three stages of a first stage A, a second stage B and a third stage C shown in FIG. 5B, the shift register unit performs the following operations.

In the first stage A, the clock signal terminal CLK is input with a low level, and the first voltage terminal VGH is input with a high-level signal (for example, the first voltage terminal is configured to keep being input with a high-level signal). The input terminal INPUT is input with a high-level signal, for the shift register unit of the first stage in the gate driving circuit, the high-level signal is the STV signal, while for each of the shift register units of other stages, for example, the high-level signal is the output signal (OUT) of the shift register unit of the previous stage cascaded to the each of the shift register units of other stages. Because the input terminal INTPUT is input with a high-level signal, the first transistor M1 is turned on, so that the high-level signal input from the first voltage terminal VGH charges the pull-up node PU, and the potential of the pull-up node PU is charged to a first high level.

Because the first voltage terminal VGH is kept being input with the high-level signal, the seventh transistor M7 is turned on to charge the first pull-down control node PD_CN, so that the fifth transistor M5 is turned on, and then the high-level signal input by the first voltage terminal VGH also charges the pull-down node PD. Because the pull-up node PU is at the first high level, the sixth transistor M6 and the eighth transistor M8 are turned on, so that the pull-down node PD and the first pull-down control node PD_CN are electrically connected to the second voltage terminal VGL (for example, the second voltage terminal is configured to keep being input with a low-level signal). In terms of the design of the transistors, the seventh transistor M7 and the eighth transistor M8 may be configured that (for example, for the size ratio, the threshold voltage, etc. of the two) in the case where M7 and M8 are both turned on, the level of the first pull-down control node PD_CN is pulled down to a low level; similarly, the fifth transistor M5 and the sixth transistor M6 may be configured that (for example, for the size ratio, the threshold voltage, etc. of the two) in the case where M5 and M6 are both turned on, the level of the pull-down node PD is pulled down to a low level, thereby ensuring that the third transistor M3 and the ninth transistor M9 are in an off-state during the first stage A.

Because the pull-up node PU is at the first high level, the fourth transistor M4 is turned on, and the clock signal terminal CLK is input with a low-level signal at this time, during the first stage A, the first output terminal OUTPUT outputs the low-level signal.

In the second stage B, the clock signal terminal CLK is input with a high-level signal, the first voltage terminal VGH is still input with a high-level signal, and the input terminal INPUT is input with a low-level signal. Because the input terminal INPUT is input with a low-level signal, the first transistor M1 is turned off, and the pull-up node PU maintains the first high level of the previous stage, so that the fourth transistor M4 is kept in an on-state. Because the clock signal terminal is input with a high-level signal during the second stage B, the first output terminal OUTPUT outputs a high-level signal.

Due to the bootstrap effect of the storage capacitor C1, the level of the pull-up node PU is further pulled up to reach a second high level, so that the fourth transistor M4 is turned on more sufficiently. Because the potential of the pull-up node PU is at a high level, the sixth transistor M6 and the eighth transistor M8 continue to be turned on, respectively pulling down the potentials of the pull-down node PD and the first pull-down control node PD_CN to the low level input by the second voltage terminal. Because the potential of the pull-down node PD is at a low level, the third transistor M3 and the ninth transistor M9 are kept in an off-state, thereby not affecting the normal output of the shift signal by the shift register units.

In the third stage C, the clock signal terminal CLK is input with a low-level signal, the first voltage terminal VGH continues to be input with a high-level signal, and the input terminal INPUT continues to be input with a low-level signal. The reset terminal RESET is input with a high-level signal, for the shift register unit of the last stage in the gate driving circuit, the high-level signal is the RST signal, while for each of the shift register units of other stages, for example, the high-level signal is the output signal (OUTPUT) of the shift register unit of the next stage cascaded to the each of the shift register units of other stages. Because the reset terminal RESET is input with a high-level signal, the second transistor M2 is turned on, and the potential of the pull-up node PU is pulled down to the low level input by the second voltage terminal VGL, so that the fourth transistor M4 is turned off.

Because the first voltage terminal VGH is kept being input with the high-level signal, the seventh transistor M7 is turned on to charge the first pull-down control node PD_CN, and then the fifth transistor M5 is turned on to charge the pull-down node PD. Because the potential of the pull-up node PU is at a low level, the sixth transistor M6 and the eighth transistor M8 are turned off, the discharge path of the pull-down node PD is turned off, and the pull-down node PD is charged to a high level, thereby allowing the third transistor M3 and the ninth transistor M9 to be turned on, thereby respectively pulling down the potentials of the pull-up node PU and the first output terminal OUTPUT to the low level input by the second voltage terminal VGL, and eliminating the noise that may be generated at the first output terminal OUTPUT and the pull-up node PU of the shift register unit in a non-output stage.

Figure 5B:
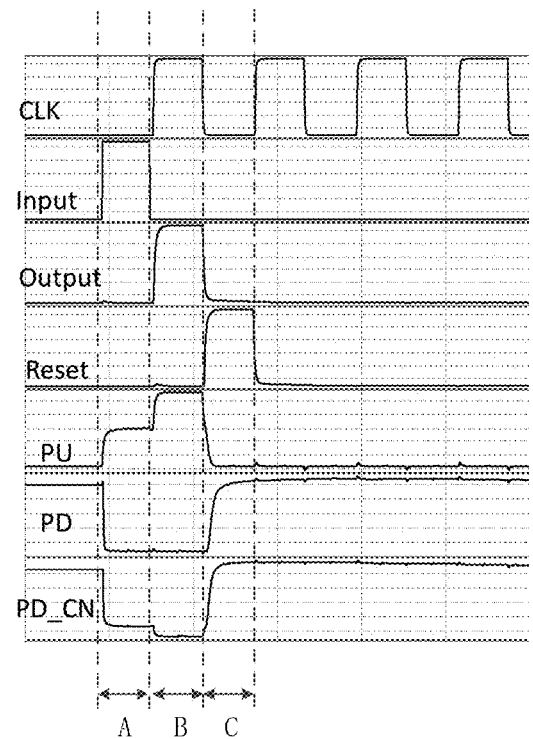
FIG. 5B is a timing diagram of the shift register as shown in FIG. 5A.

It should be particularly noted that what is shown in FIG. 5A and FIG. 5B is only an exemplary illustration, and the present disclosure is not limited to the shift register circuit shown in FIG. 5A and the timing diagram shown in FIG. 5B.

Figure 6:
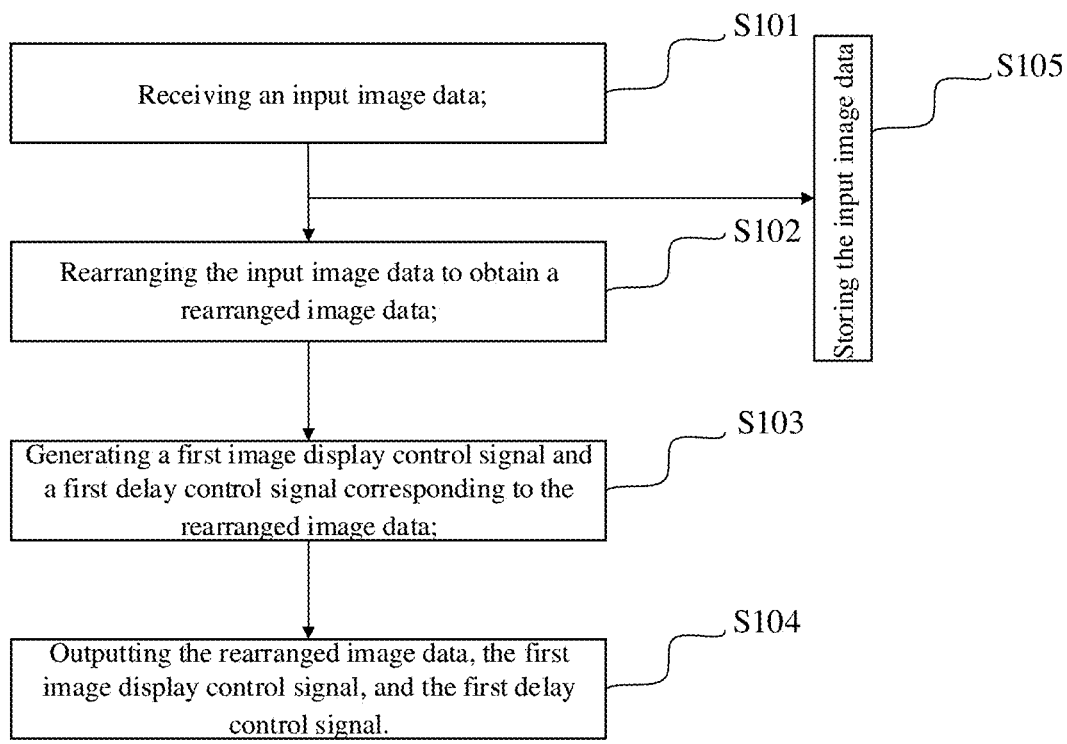
FIG. 6 is a flow chart of a display control method provided by at least one embodiment of the present disclosure.

At least some embodiments of the present disclosure provide a display control method and a display control device. FIG. 6 is a flow chart of a display control method provided by at least one embodiment of the present disclosure.

As shown in FIG. 6, the display control method includes performing a first display mode using an input image data. Performing the first display mode includes the following steps.

Step S102, rearranging the input image data to obtain a rearranged image data.

Step S103, generating a first image display control signal and a first delay control signal corresponding to the rearranged image data.

Step S104, outputting the rearranged image data, the first image display control signal, and the first delay control signal.

In step S102, the input image data includes a valid line part for actual display on a display panel and an invalid line part for non-actual display on the display panel, and the rearranged image data includes a rearranged valid line part and a rearranged invalid line part corresponding to the valid line part and the invalid line part, respectively.

In the above-mentioned method, the first image display control signal is configured to perform a frame display corresponding to the rearranged image data during the display operation, and the first delay control signal is configured to trigger a line scanning process for the rearranged valid line part in the display panel during a process of the frame display. As mentioned above, the "first" in expressions such as "the first image display control signal", "the first delay control signal", etc., is only used for distinction, not for limitation, so in appropriate contexts, "image display control signal", "delay control signal", etc., may also be used directly.

The display control method of the embodiments of the present disclosure is suitable for the case where only part of the line data of the input image is displayed on the display panel, for example, the display panel is a strip-shaped display panel (displays only a part of the picture instead of the whole picture), which includes a gate driving circuit, a data driving circuit, and a pixel array. The gate driving circuit is configured to receive a gate scanning signal to scan the pixel array, the data driving circuit is configured to receive an image data signal and provide the image data signal to the pixel array, and the pixel array is configured to receive the image data from the data driving circuit to perform the display operation under the control of the gate driving circuit.

For example, the above-mentioned first display mode can enable a strip-shaped display used upside down to achieve a normal upright viewing (opposite to the inverted direction) without changing the size specification of the input image data and without changing the scanning direction of the gate driving circuit of the display panel, thus saving costs and expanding the applicable scenarios of the strip-shaped display.

For example, the input image is full frame, for example, is 1920*1080 in size (i.e., 1920 columns and 1080 rows). The input image includes a valid line part and an invalid line part, for example, the first 360 lines of the input image are the valid line part of the input image, and the remaining last 720 lines are the invalid line part of the input image. The display panel may be a strip-shaped display panel, for example, a strip-shaped display region of 1920*360 (i.e., 1920 columns and 360 rows). It should be noted that the embodiments of the present disclosure are not limited to the input image of the above-mentioned size and the display panel of the above-mentioned size.

As mentioned above, if the input image does not undergo any processing, the inverted strip-shaped display panel only displays the first 360 lines of the 1920*1080 image, and the remaining last 720 lines are not displayed on the strip-shaped display panel, but due to the case that the strip-shaped display panel is, for example, inverted relative to the ground (here as a reference plane), so the viewer standing on the ground sees an inverted image as well. In the following examples, inverted direction, upright direction, etc. are all relative to the ground, but the embodiments of the present disclosure are not limited to such scenarios.

In the display control method of the embodiments of the present disclosure, the input image is rearranged, so that the display panel is used normally without changing the placement state of the display panel. For example, the entire input image is inverted and rearranged, or only the above-mentioned valid line part is inverted and rearranged.

The input image includes the valid line part and the invalid line part, correspondingly, the rearranged image after rearrangement includes a rearranged valid line part and a rearranged invalid line part. For example, after the above-mentioned 1920*1080 input image is inverted and rearranged, the valid lines of the inverted rearranged image are 721~1080 lines (360 lines in total) at the bottom, that is, corresponding to the valid line part of 1~360 lines of the original input image, and the invalid lines of the inverted rearranged image are 1~720 lines at the top, that is, corresponding to the invalid line part of 361~1080 lines of the original input image.

In step S103, the first image display control signal and the first delay control signal are generated corresponding to the rearranged image data. For example, the first image display control signal includes various control signals generated corresponding to the rearranged image after the above-mentioned rearrangement, for example, these control signals include a line data start signal (STH), a data clock signal (CPH), a data output signal (TP), etc., for the data driving circuit, and further include a frame scan start signal (STV), clock signals (CLK signals), etc., for the gate driving circuit. However, in the scanning process, the STV signal does not actually work, and is only used to set the start time of one frame of display, so that the time point at which the delay control signal takes effect is determined.

For example, the first delay control signal is configured to generate a scan start signal of the gate driving circuit of the above-mentioned display panel. For example, the first delay control signal (DCI) is a trigger signal similar to the STV signal but delayed by a set time from the above-mentioned STV signal. For example, the first delay control signal is obtained according to a position of the rearranged valid line part in the rearranged image data. For example, in the above-mentioned example, in the case where the input image data is 1920*1080 in size and the valid line part is 1~360 lines, then correspondingly, the position of the first line of the rearranged valid line part in the rearranged image data is line 721, so the first delay control signal is determined by calculating the scanning time from line 1 to line 720, that is, calculating the scanning time of the invalid line part.

For example, assuming that the display refresh rate of the display panel is 60 Hz, and the display time of each frame (that is, displaying the rearranged image data once) is $1/60$ second, then in the above-mentioned example, for each frame, without considering the relatively small inter-frame blanking interval (blanking), the first delay control signal is delayed by $(1/60)*(720/1080)=1/90$ second compared with the STV signal of the frame, that is, $1/90$ second after the STV signal.

After that, the rearranged image data, the first image display control signal and the first delay control signal are output to the display panel for display. The first image display control signal is configured to perform a frame display corresponding to the rearranged image data during the display operation, and the first delay control signal is configured to trigger the line scanning process for the rearranged valid line part in the display panel during the frame display process. As a result, the line originally located at the back in the valid line part of the input image data becomes the front line in the rearranged valid line part of the rearranged image data, and is displayed on the display panel first, thereby the inverted display panel with respect to the ground displays an inverted image, while a viewer standing on the ground sees the upright image.

For example, in one embodiment, the first image display control signal is normally generated and output, but is in an inactive state before the first delay control signal arrives, that is, is not actually provided to the display panel; or at least the STV signal (frame scan start signal) is not actually provided to the gate driving circuit of the display panel or is not actually generated, so the gate driving circuit of the display panel does not output the gate scanning signal, so it does not actually perform the display operation. In this case, when the first delay control signal arrives, the image display control signal is actually applied to the frame display of the display panel. Specifically, the gate driving circuit of the display panel is triggered by the first delay control signal, and starts to generate the gate scanning signal according to the timing signal, and the data driving circuit of the display panel simultaneously outputs the data signal, so as to realize, for example, progressive display or interlaced display.

For example, the CLK signal is provided to the gate driving circuit of the display panel during a delay interval generated by the rearranged image data (corresponding to the rearranged invalid line part of the rearranged image data). For another example, the CLK signal is not actually provided to the gate driving circuit of the display panel or is not actually generated during the delay interval generated by the rearranged image data (corresponding to the rearranged invalid line part of the rearranged image data).

For example, the inverted rearranged image data (that is, the image data of the rearranged image), the first image display control signal, and the first delay control signal are output simultaneously, but the rearranged valid line part displayed by the display panel is subjected to line scanning under the triggering of the first delay control signal (for example, another signal similar to the STV signal). For example, in the above-mentioned example in which the input image data is 1920*1080 in size and the display refresh rate is 60 Hz, the first line of the rearranged valid line part is the line 721 in the rearranged image data, therefore, when the start time (that is, the time of the STV signal) of the first image display control signal passes $1/90$ second, that is, the time corresponds to the time when the line scanning is performed on the line 720, the first delay control signal triggers the gate driving circuit of the display panel, thereby the gate driving circuit starts to sequentially output gate scanning signal at respective output ports including OUT1 (corresponding to the actual first line of the display panel) to OUT360 (corresponding to the actual line 360 of the display panel), and the data driving circuit starts to sequentially output the image data line by line to output the rearranged valid line part (that is, line 721 to line 1080) in the rearranged image data, and display the rearranged valid line part on the display panel (for this, please refer to the description below of FIG. 7C). For example, in the case of progressive scanning, the gate driving circuit of the display panel outputs the gate scanning signal one by one in the order from the output port OUT1 to the out port OUT360, and synchronously, the data driving circuit outputs the image data line by line in the order from the line 721 to the line 1080 in the rearrange valid line part, thereby realizing display. The line 360 of the valid line part of the input image data (corresponding to the line 721 of the rearrangement valid line part) is displayed first, and the first line of the valid line part of the input image data (corresponding to the line 1080 of the rearrangement valid line part) is displayed last. Therefore, the valid line part of the input image data is displayed upside down for the display panel itself, but a viewer standing on the ground and looking at the display panel upside down relative to the ground sees the upright image.

For example, in at least some embodiments of the present disclosure, the above-mentioned display control method further includes step S101 and/or step S105.

In step S101, receiving an input image data. The input image data is received for subsequent processing. The input image data is, for example, received from a modem, and the modem, for example, receives the input image data through a wired or wireless network. The input image data may be a static image, a dynamic image, or a video. Alternatively, the input image data is, for example, from a storage device known from a display device itself, and the storage device is, for example, a hard disk (a mechanical hard disk or a solid-state disk), or a pluggable storage device, such as a USB flash disk, etc.

In step S105, storing the input image data. For example, the input image data is stored by, but not limited to, a volatile storage manner or a non-volatile storage manner to perform subsequent image data processing.

Therefore, by performing the above-mentioned technical solution, the technical problem that the picture displayed on the strip-shaped display is inverted when the strip-shaped display is used upside down is solved, so that under the condition that the input image data does not to be inverted by the above-mentioned system client, the technical effect that the strip-shaped display can still display the input image data normally is achieved, and the versatility and compatibility of the strip-shaped display are also improved.

Figure 8:
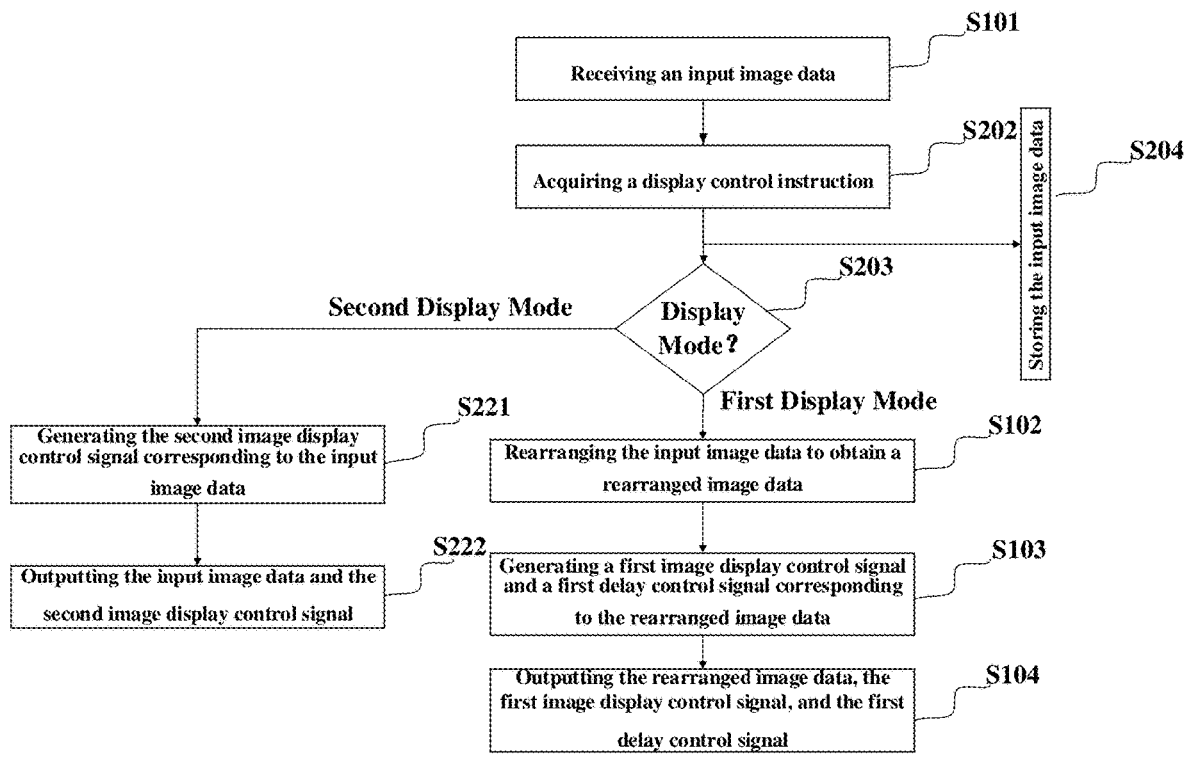
FIG. 8 is a flow chart of the display control method provided by another embodiment of the present disclosure.

FIG. 8 is a flow chart of a display control method provided by another embodiment of the present disclosure. As shown in FIG. 8, for example, on the basis of the display control method shown in FIG. 6, the display control method further includes the following steps.

Step S202, acquiring a display control instruction.

Step S203, selecting to perform a first display mode or to perform a second display mode in response to the display control instruction.

For example, the display control method includes two display modes, namely a first display mode and a second display mode. For example, the display control method described in the above-mentioned embodiments corresponds to the first display mode, and the display operation is performed on the display panel using the rearranged image data, the first image display control signal, and the first delay control signal. In the first display mode, the display panel is placed upside down, for example, is placed upside down for installation relative to its own normal placement reference orientation. In the second display mode, the display operation is performed on the display panel using the input image data and a second image display control signal. In the second display mode, the display panel is placed in the upright direction, that is, is placed or installed according to its own normal placement reference orientation. It should be noted that the above-mentioned "first" and "second" are only for the convenience of distinguishing two different display modes, and do not constitute a limitation on the embodiments of the present disclosure.

For example, in the second display mode, the display control method of this embodiment includes the following steps.

Step S221, generating the second image display control signal corresponding to the input image data.

Step S222, outputting the input image data and the second image display control signal.

For example, in one example, in step S202, a display control instruction is acquired, for example, an input port of the display system to which the display panel belongs is read, and the display control instruction is acquired according to different states of the input port. For example, the display control instruction is acquired when the input image data is received, or is acquired at other times, such as after receiving the input image data. For example, the input port is a certain pin or switch of the display device. If the pin or switch is set to high (H), it means that the first display mode is performed, and if the pin or switch is set to low (L), it means that the second display mode is performed. For another example, the input port communicates (e.g., is directly connected) with a sensing element (e.g., a gravity sensing element), and the sensing element can sense the orientation of the display panel relative to a predetermined direction (e.g., the gravitational direction). For example, when the display panel is placed upright (e.g., relative to the ground), the sensing element outputs high (H), indicating that the second display mode is performed; and when the display panel is placed upside down (e.g., relative to the ground), the sensing element outputs low (L), indicating that the first display mode is performed. The gravity sensing element is, for example, a switch that uses gravity to open and close. For example, the gravity sensing element is closed due to the gravity of the switch blade itself when placed upright and is opened due to the gravity of the switch blade itself when placed upside down.

The display control instruction may be executable instruction data for judging the selection of the first display mode or the second display mode, for example, including a first executable code representing the first display mode, for example, the instruction code code1, and a second executable code representing the second display mode, for example, the instruction code code2.

For example, in step S203, the first executable code or the second executable code is selected to execute in response to the display control instruction, thereby selecting to perform the first display mode or the second display mode. For example, when the instruction code code1 is received, the first display mode is selected, and when the instruction code code2 is received, the second display mode is selected. For example, the first executable code and the second executable code are stored in a storage device for easy access by a system and execution by a processor, thereby performing the operations in the first display mode or the operations in the second display mode accordingly.

For example, in step S221, the second image display control signal corresponding to the input image data is generated. The second image display control signal is configured to perform the frame display corresponding to the input image data during the display operation.

For example, in step S222, the input image data and the second image display control signal are output. For example, the input image data and the second image display control signal that have not undergone image inversion processing and delay processing are directly output to the output circuit, so that the display panel performs a normal display operation to realize the second display mode. For example, the second display mode is a display mode in which the display panel is used normally and is placed upright.

For example, in one embodiment, because the input image data and the rearranged image data have the same specifications, that is, they have the same number of rows and columns, so the second image display control signal and the above-mentioned first image display control signal have similar specifications, that is, have the same STV, CLK, STH, CPH, TP, etc. The difference between the second image display control signal and the first image display control signal includes the following: the first image display control signal cooperates with the first delay control signal, and does not directly drive the display panel at the beginning, but drives the gate driving circuit of the display panel for display when there is the first delay control signal, thereby delaying driving the gate driving circuit of the display panel, so as to achieve the effect of delayed display; and the second image display control signal does not have a corresponding delay control signal, so the second image display control signal directly drives the gate driving circuit of the display panel for display from the beginning, that is, the STV signal included in the second image display control signal acts on the gate driving circuit of the display panel from the beginning, thus the gate driving circuit generates the gate scanning signal in sequence.

For the above example in which the valid line part of the input image data is from line 1 to line 360, the second image display control signal, which is configured to display the input image on the display panel, drives the gate driving circuit of the display panel to perform display from the beginning.

However, in another example, the input image data is 1920*1080 in size, and the valid line part is from line 281 to line 720, that is, the valid line part includes the approximate middle part of the input image data; correspondingly, the rearranged image data after inversion processing is also 1920*1080 in size, and the rearrangement valid line part is from line 361 to line 800 in the rearranged image. Then, in the first display mode, the first image display control signal and the first delay control signal including a delayed time of a scanning time of 360 lines are generated based on the rearranged image data, so that displaying the inverted image is realized in the inverted display panel; and in the second display mode, the second image display control signal and the second delay control signal including a delayed time of a scanning time of 280 lines are generated based on the input image data, so that displaying the upright image is realized in the display panel that is placed upright. Therefore, in the case where the valid line part is located in the middle part of the input image data, in the second display mode, a corresponding delay control signal also needs to be added for the input image data that is not undergoing the rearrangement processing.

Figure 9:
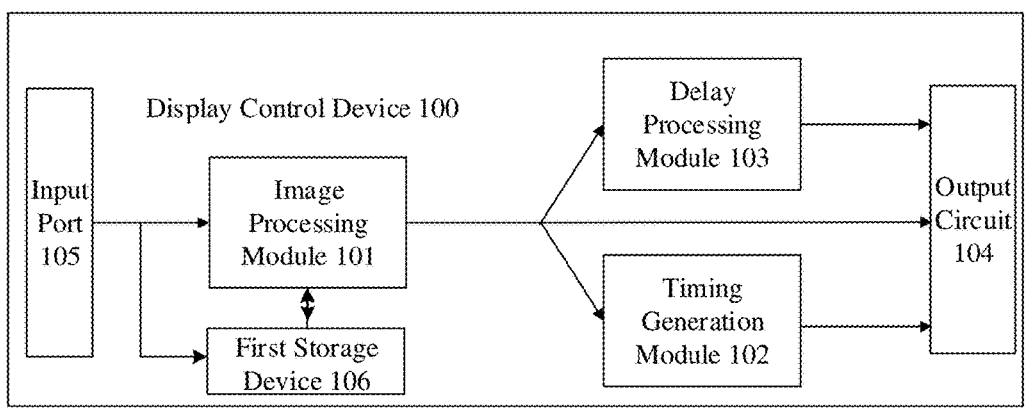
FIG. 9 is a schematic diagram of a display control device provided by at least one embodiment of the present disclosure.

FIG. 9 is a schematic diagram of a display control device provided by at least some embodiments of the present disclosure. For example, the display control device is used to implement the display control method as shown in FIG. 6.

As shown in FIG. 9, the display control device 100 includes an image processing module 101, a timing generation module 102, a delay processing module 103, an output circuit 104, an input port 105, and a first storage device 106. For example, the display control device is implemented at least partially in the form of a TCON chip, for example, the TCON chip includes the image processing module 101, the timing generation module 102, the delay processing module 103, and the output circuit 104 mentioned above. For example, the first storage device 106 is inside the TCON chip, or is set outside the TCON chip, but must be set on the same printed circuit board with the TCON chip, so that the first storage device 106 and the TCON chip are connected to each other through a bus. The display control device may also be implemented as a combination of a CPU and a memory, and may also be implemented as a form of SoC, FPGA, ASIC, etc., and the embodiments of the present disclosure do not limit the implementation manner of the display control device. Moreover, the image processing module 101, the timing generation module 102, the delay processing module 103, the output circuit 104, etc., may be arbitrarily combined in one or more circuit devices or components.

For example, the image processing module 101 is configured to rearrange an input image data received to obtain a rearranged image data. For example, the image processing module 101 includes an image data rearrangement circuit, and the image data rearrangement circuit is configured to perform an overall inversion rearrangement operation on the input image data, for example, perform inversion and rearrangement of the entire 1920*1080; or in some examples, the rearrangement operation is performed only on the valid line part, for example, only the valid line part of 1920*360 is inverted and rearranged to obtain the rearranged image data.

For example, the timing generation module 102 is configured to generate a first image display control signal, corresponding to the rearranged image data (the number of rows and columns of the image), in the case of considering the display refresh rate of the display panel, for example, the first image display control signal includes an STH signal (a line data start signal), a CPH signal (a data clock signal), etc., for the data driving circuit. For example, the first image display control signal further includes an STV signal (a frame scan start signal), CLK signals (clock signals), etc., for the gate driving circuit, the first image display control signal is configured to perform a frame display corresponding to the rearranged image data during the display operation, and the STV signal does not actually work during the scanning process, but is only used to set the start time of one frame display, so that the time point at which the delay control signal works is determined. For example, when the display panel performs image display, the rearranged image data will be displayed according to the first image display control signal.

For example, the delay processing module 103 is configured to generate a first delay control signal corresponding to the rearranged image data. For example, the first delay control signal is configured to trigger a line scanning process for the rearranged valid line part in the display panel during a process of the frame display, for example, when the display panel performs image display, the first delay control signal is configured to trigger the process of correctly displaying the rearranged image data according to the first image display control signal. For example, the first delay control signal is obtained according to a position of the rearranged valid line part in the rearranged image data, or the first delay control signal is obtained by presetting. Here, for example, the "presetting" refers to presetting the output time of the delay control signal preset in the system. For example, the presetting is fixed (for example, written into the system and cannot be changed), or is determined by the user as required, or is determined according to system board instructions.

For example, the delay processing module 103 includes a gate signal timing adjustment module, and the gate signal timing adjustment module is configured to set the first delay control signal later than the STV signal, which is included in the first image display control signal, by a predetermined time. The predetermined time is obtained according to the position of the rearranged valid line part in the rearranged image data, or the predetermined time is obtained by presetting. Similarly, for example, the "presetting" here refers to presetting the predetermined time in the system. For example, the presetting is fixed (for example, written into the system and cannot be changed), or is determined by the user as required, or is determined according to system board instructions.

For example, the delay processing module 103 is further configured to implement a delay control mode. For example, the above-mentioned delay control mode includes that delay processing module 103 calculates the delay time T1 corresponding to the rearranged invalid line part according to the amount of data rows (N_Dummy) of the rearranged invalid line part, and calculates the working time T2 corresponding to the rearranged valid line part according to the amount of data rows (N_Active) of the rearranged valid line part. For example, the data driving circuit always normally outputs full-frame rearranged image data such as 1920*1080 line by line. During the T1 time interval, no STV signal acts on the gate driving circuit, and the delay processing module 103 does not send frame scan start signal STV to the gate driver, so in the T1 time interval, the gate driver does not generate a gate output signal, such as the GOUT signal. In the T2 time interval, for example, at the junction of the T1 time interval and the T2 time interval, for example, at the time point corresponding to the data of line 720, the delay processing module 103 starts to send a trigger signal (i.e., DCI) similar to the frame scan start signal STV to the gate driver. Therefore, in the T2 time interval, the gate driver starts to generate gate scanning signal line by line, such as the GOUT signal, so that the rearranged valid line part is start to display on the display panel line by line from line 721 of the rearranged image data.

For example, the output circuit 104 communicates with the display panel for outputting the rearranged image data, the first image display control signal, and the first delay control signal to the display panel, so that the display panel is driven by these signals to perform the display operation.

For example, the input port 105 is configured to acquire the input image data, or, in some examples, is also configured to acquire other signals related to the display of the input image data, such as a display mode control instruction signal and the like. The input port 105 is, for example, a port of an input circuit, and the input circuit is, for example, a modem, or a USB driving circuit, etc. For example, the input port includes a pin or switch, if the pin or switch is set high (H), the first display mode is performed, and if the pin or switch is set low (L), the second display mode is performed.

For example, the first storage device 106 is configured for temporary or long-term storage of the input image data, for example, subsequent image processing operations are facilitated by temporarily storing the input image data. For example, in the case where the input port 105 cannot acquire the input image data in a real-time, high-speed and stable manner, the input image data can be stored in the memory in advance, so as to realize a cache function. The first storage device 106 is, for example, a semiconductor storage device.

The above-mentioned display control device can enable a conventional input image to be displayed normally on a strip-shaped screen used upside down (relative to the ground, for example) for viewers standing on the ground without changing the way in which the system client provides the input image data, thereby improving the compatibility of the display panel.

Figure 10:
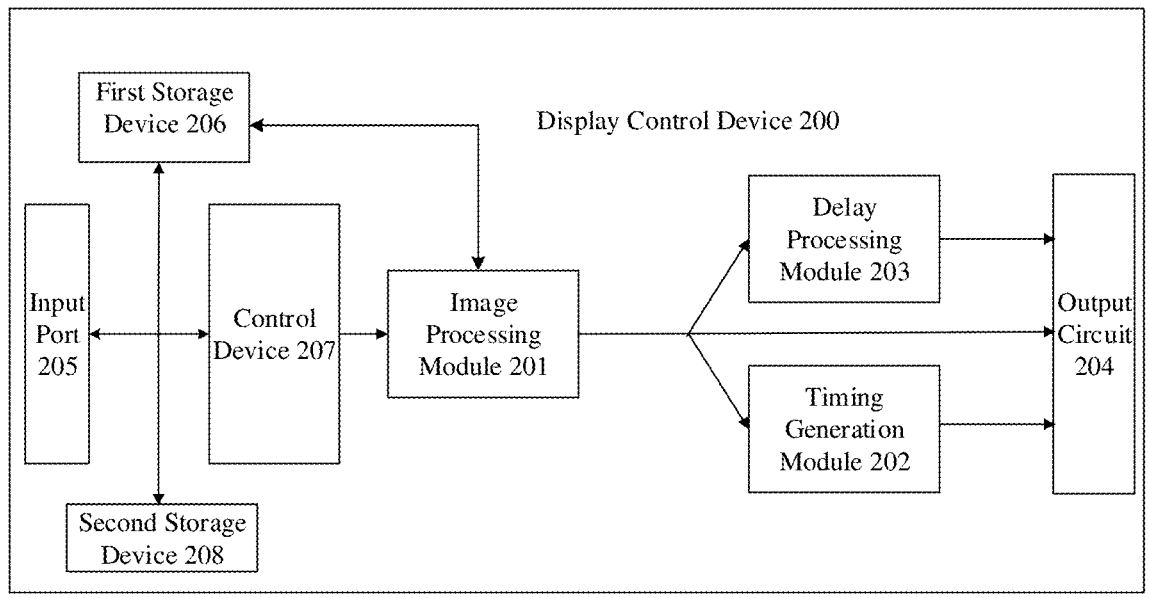
FIG. 10 is a schematic diagram of a display control device provided by another embodiment of the present disclosure.

FIG. 10 is a schematic diagram of a display control device provided by another embodiment of the present disclosure. The display control device 200 shown in FIG. 10 adds a control device 207 and a second storage device 208 to the display control device 100 shown in FIG. 9.

For example, the timing generation module 202 is further configured to directly generate a second image display control signal corresponding to the input image data. For example, the second image display control signal is configured to perform a frame display corresponding to the input image data during the display operation. For example, when the display panel performs image display, the input image data is displayed correctly according to the second image display control signal. For example, the second image display control signal includes STV, CLK, etc., generated corresponding to the input image data, so as to control the display panel to perform the display operation.

For example, the control device 207 is configured to select to perform the above-mentioned first display mode or to perform the second display mode according to the display control instruction. For example, the executable code code1 and the executable code code2 respectively corresponding to the first display mode and the second display mode are stored in the second storage device. For example, in the case where the display control instruction received by the control device 207 is to perform the first display mode, code1 is called from the second storage device and executed, thereby entering the first display mode, and allowing the image processing module 201 to rearrange the input image data to obtain the rearranged image data. The delay processing module 203 generates a first delay control signal corresponding to the rearranged image data, the timing generation module 202 generates a first image display control signal corresponding to the rearranged image data, and then the output circuit 204 outputs the rearranged image data, the first delay control signal, and the first image display control signal to the display panel for displaying in the first display mode.

For example, the output circuit 204 is further configured to output the input image data and the second image display control signal for performing a display operation of the second display mode on the display panel. For example, in the case where the display control instruction received by the control device 207 is to perform the second display mode, the code2 is called from the second storage device and executed, thereby selecting the second display mode. The image processing module does not rearrange the input image data, the timing generation module 202 generates a second image display control signal corresponding to the input image data, and then the output circuit 204 outputs the input image data and the second image display control signal to the display panel for displaying in the second display mode.

For example, the second storage device 208 is configured to store a first executable code (code1) corresponding to the first display mode and a second executable code (code2) corresponding to the second display mode. For example, the above-mentioned control device 207 can read the corresponding code from the second storage device 208 to determine the corresponding display mode. The second storage device 208 may be a semiconductor storage device, such as an EEPROM or a flash, and is connected to a control device, an image processing module, etc., for example, through an I2C bus.

The above-mentioned display control device can realize a variety of display modes according to the user's choice, so that the user can easily and conveniently switch different display modes according to the needs of normal display regardless of whether the strip-shaped display panel is placed or installed normally, or placed or installed upside down.

Figure 7A:
FIG. 7A is an exemplary input image.

The above-mentioned display control method and display control device are further described below with reference to exemplary FIG. 7A, FIG. 7B and FIG. 7C. FIG. 7A is an exemplary input image. As shown in FIG. 7A, the input image acquired from the input port is, for example, an image with a size of 1920*1080. The upper strip region in FIG. 7A is, for example, a normal display region (valid line part) of a strip-shaped display panel with a size of 1920*360, and the lower blank region is a region (invalid line part) that does not need to be displayed normally.

For example, the image in FIG. 7A is rearranged by the above-mentioned image processing module, for example, the image is turned upside down according to the actual situation. It should be noted that the present disclosure does not limit the specific rearrangement manner. For example, corresponding to the inversion using of the display panel, the input image is inverted and rearranged upside down to obtain the rearranged image shown in FIG. 7B. Thus, the valid line part originally in the upper part of FIG. 7A, such as the part of the first 360 lines, appears in the lower part of FIG. 7B after inverted rearrangement, and becomes the rearrangement valid line part, such as the part of the last 360 lines; and the invalid line part originally in the lower part of FIG. 7A, such as the part of the last 720 lines, appears in the upper part of FIG. 7B after inverted rearrangement, and becomes the rearrangement invalid line part, such as the part of the first 720 lines.

Figure 7B:
FIG. 7B is a rearranged image after rearranging the input image as shown in FIG. 7A.
Figure 7C:
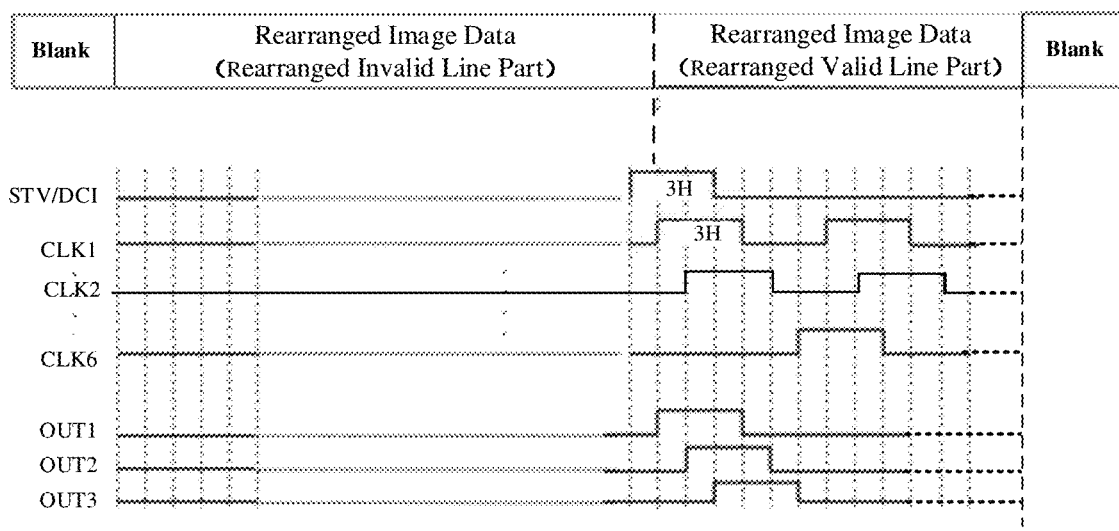
FIG. 7C is a timing diagram of the delay processing of the display control method provided by at least one embodiment of the present disclosure.

For example, FIG. 7C is a processing timing diagram corresponding to the display control method of the rearranged image data of FIG. 7B. In the embodiment shown in FIG. 7C, the first image display control signal generated corresponding to the rearranged image data shown in FIG. 7B includes STV and CLK1, CLK2, . . . , CLK6, etc., (more CLK may be included as required). However, these signals do not generate gate scanning signal in the display panel during the time period corresponding to the rearranged invalid line part (the function of which is to play a timing function in this case), or in other embodiments, the first image display control signal does not include the STV signal. At the start point of the time period corresponding to the rearranged valid line part, a delay control signal (DCI), the function of which is similar to the STV signal, is provided to the gate driving circuit of the display panel, so that the gate driving circuit of the display panel starts to sequentially output gate scanning signal. In the illustrated embodiment, "H" in the figure represents the actual turn-on time allocated for each row of gate lines, the period of each CLK signal (CLK1, CLK2, . . . , CLK6) is 6H, and the corresponding high level phase is 3H, thus the high level phase of each of the resulting gate scanning signals OUT1, OUT2, OUT3, . . . , etc., is also 3H.

During the continuous display process of the display panel, the STV signal and/or the DCI signal are both periodic signals, and their frequency are respectively equal to the display refresh frequency of the display panel. For example, the STV signal and/or the DCI signal are obtained by dividing the frequency of the system clock signal, and the delay of the DCI signal relative to the STV signal, or the delay of the DCI signal relative to the preset start time of the frame display in the case where the STV signal is not generated, is realized by, for example, a counting circuit driven by the CLK.

For example, in the timing diagram shown in FIG. 7C, the blank region is followed by a delay interval generated corresponding to the above-mentioned rearranged image data, and the delay interval corresponds to the rearranged invalid line part of the rearranged image data, for example, the first 720 lines part of the rearranged image data as described above. During this delay interval, timing control signals such as CLK and STV are in an invalid state, so that the gate scanning signals such as OUT1, OUT2, OUT3, etc., of each output terminal of the gate driver are also in an invalid state. In the stage corresponding to line 720, the delay control signal (DCI) is applied to the input terminal of the first shift register unit of the gate driving circuit, thus the gate driving circuit starts to work to sequentially generate gate scanning signals OUT1, OUT2, OUT3, . . . , etc., each gate scanning signal corresponds to one line of image data, and correspondingly, the data driving circuit outputs image data signals corresponding to lines 721 to 1080.

In the timing shown in FIG. 7C, the valid stages (i.e., the high-level part of the waveform in the figure) of the respective gate scanning signals OUT1, OUT2, OUT3, . . . , etc., following the delay control signal generally correspond to the rearrangement valid line part of the rearranged image data. In this interval, the display panel starts to work, and the rearranged valid line part is normally displayed on the inverted strip-shaped display panel, so that the upper valid line part of the original input image data is located at the lower part of the rearranged image data after the inversion rearrangement operation, and after performing a delay corresponding the rearranged image data, the rearranged valid line part located at the lower part of the rearranged image data will be displayed on the inverted strip-shaped display panel. Because the strip-shaped display panel is placed upside down, the final result will invert the inverted rearranged image again, so that the display effect is an upright image.

The above process can, in the case of without changing the way in which the system client provides the image data, achieve normal display the input image data on display panels with different placement manners by rearranging the input image data and performing a delay corresponding the rearranged input image data.

Figure 11:
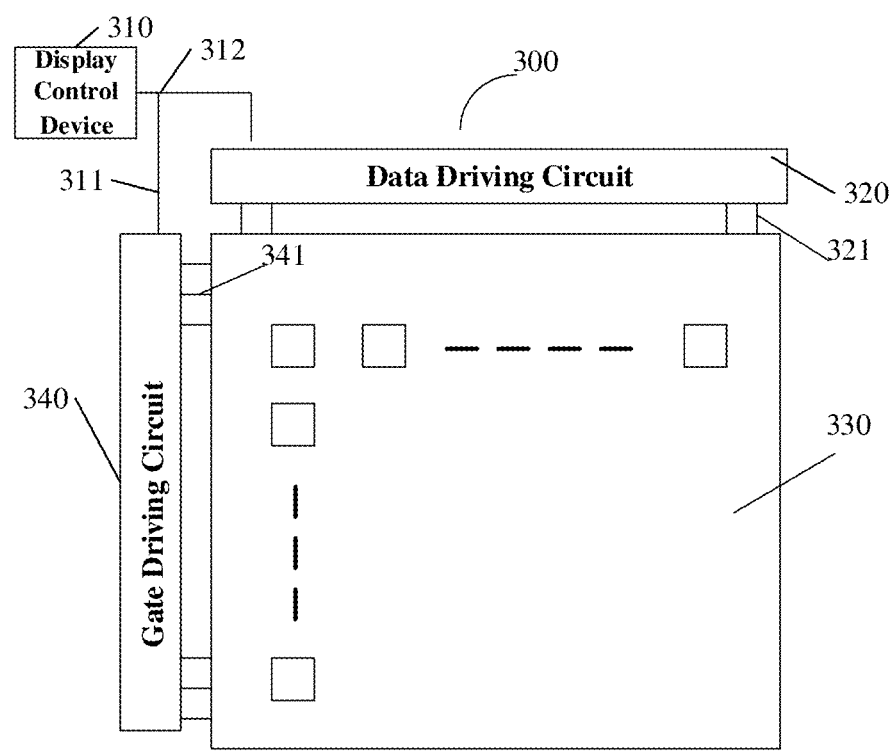
FIG. 11 is a schematic diagram of a display device provided by at least one embodiment of the present disclosure.

FIG. 11 is a schematic diagram of a display device provided by at least some embodiments of the present disclosure. As shown in FIG. 11, the display device 300 includes a display control device 310 provided by any one of the embodiments of the present disclosure, and the display control device 310 is, for example, a timing control circuit (TCON). The display device 300 includes a display panel 330, and the display panel 330 includes a pixel array composed of a plurality of pixel units. For example, the display device 300 further includes a data driving circuit 320 and a gate driving circuit 340. The data driving circuit 320 is configured for providing data signals to the pixel array, and the gate driving circuit 340 is configured for receiving a scan control signal to provide the gate scanning signal to the pixel array. The display control device 310 is electrically connected to the data driving circuit 320 through a signal line 312, the display control device 310 is electrically connected to the gate driving circuit 340 through a signal line 311, the data driving circuit 320 is electrically connected to the pixel units through a plurality of data lines 321, and the gate driving circuit 340 is electrically connected to the pixel units through a plurality of gate lines 341.

In a specific embodiment, using the display device 300 upside down refers to keeping the light-emitting direction of the display device 300 unchanged, and rotating the display device 300 by 180°. For example, when the display device 300 is suspended for use relative to the ground, the light-emitting direction of the light-emitting surface is parallel to the ground, the data driving circuit 320 is located on a sky side and/or a ground side of the display device 300, and the gate driving circuit 340 is located on a left side and/or a right side of the display device 300. For example, when the display device 300 is suspended for use, the light-emitting direction of the light-emitting surface is parallel to the ground. In the case where the data driving circuit 320 is located on the ground side of the display device 300, the data driving circuit 320 is set on the sky side of the display device 300 by the inversion processing on the display device 300 in this case. The display device 300 can realize an upright display of images when the display device 300 is used upside down. Further, the display device 300 may be a strip-shaped display screen, and its display region includes a long side and a short side. For example, the data driving circuit 320 is located on the long side, and the gate driving circuit 340 is located on the short side, preferably, the gate driving circuit 340 is a GOA driving circuit. The strip-shaped display can realize the upright display of images when it is used upside down.

In a specific embodiment, using the display device 300 upside down refers to keeping the light-emitting direction of the display device 300 unchanged, and rotating the display device 300 by 180°. For example, when the display device 300 is suspended for use relative to the ground, the light-emitting direction of the light-emitting surface is parallel to the ground, the gate line 341 is arranged parallel to the ground, and the extension direction of the data line 321 is a direction intersecting the ground (e.g., the data line 321 is perpendicular to the ground). The display device 300 can realize the upright display of images when it is used upside down. Further, the display device 300 may be a strip-shaped display screen, and its display region includes a long side and a short side. For example, the gate line 341 extends along a direction parallel to the long side, and the data line 321 extends along a direction parallel to the short side. The strip-shaped display can realize the upright display of the images when it is used upside down.

The display panel 330 is, for example, a liquid crystal display panel, an organic light-emitting diode (OLED) display panel, a quantum dot light-emitting diode (QLED) display panel, an electronic paper display panel, a plasma display panel, etc., which are not limited in the embodiments of the present disclosure.

It should be noted that the display device in the present embodiment may be any product or component with display function, such as a liquid crystal panel, a liquid crystal TV, a display, an OLED panel, an OLED TV, an electronic paper, a mobile phone, a tablet computer, a notebook computer, a digital photo frame, a navigator, etc. The display device may further include other conventional components such as a display panel, etc., which are not limited in the embodiments of the present disclosure.

For the technical effects of the display device 300 provided by the embodiments of the present disclosure, reference may be made to the corresponding description of the display control device in the above-mentioned embodiments, which will not be repeated here.

For the present disclosure, the following should be noted:

(1) The drawings involve only the structure(s) in connection with the embodiment(s) of the present disclosure, and other structure(s) can be referred to common design(s).

(2) For clarity, in the drawings used to describe the embodiments of the present disclosure, the thicknesses and sizes of layers or structures are enlarged. It can be understood that when an element such as a layer, film, region or substrate is referred to as being "on" or "under" another element, the element may be "directly" "on" or "under" another element, or one or more intermediate elements may be present.

(3) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A display control method, comprising:
performing a first display mode or second display mode using an input image data, wherein
performing the first display mode comprises:
rearranging the input image data to obtain a rearranged image data, wherein the input image data comprises a valid line part for actual display on a display panel and an invalid line part for non-actual display on the display panel, and the rearranged image data comprises a rearranged valid line part and a rearranged invalid line part corresponding to the valid line part and the invalid line part, respectively;
generating a first image display control signal and a first delay control signal corresponding to the rearranged image data; and
outputting the rearranged image data, the first image display control signal, and the first delay control signal for performing a display operation on the display panel, wherein
the first image display control signal is configured to perform a frame display corresponding to the rearranged image data during the display operation, and the first delay control signal is configured to trigger a line scanning process for the rearranged valid line part in the display panel during a process of the frame display,
a position of the valid line part to be displayed on the display panel does not overlap with a position of the rearranged valid line part displayed on the display panel, a position of the invalid line part to be displayed on the display panel does not overlap with a position of the rearranged invalid line part displayed on the display panel, and the rearranged image data is obtained by performing an overall inversion rearrangement operation on the input image, so that the rearranged invalid line part of the rearranged image data is for non-actual display on the display panel,
wherein the second display mode is different from the first display mode,
wherein a display system to which the display panel belongs comprises a first executable code corresponding to the first display mode and a second executable code corresponding to the second display mode stored in a memory and the second display mode is directly switched to the first display mode or the first display mode is directly switched to the second display mode by selecting to execute the first executable code or the second executable code; and the display panel comprises a gate driving circuit for implementing the line scanning process, the first executable code is configured to rearrange the input image data to obtain the rearranged image data and generate the first image display control signal and the first delay control signal corresponding to the rearranged image data, during the frame display, a time period before the first delay control signal is triggered corresponds to the rearranged invalid line part and the gate driving circuit does not output a gate scanning signal in the time period, and a time period from the first delay control signal being triggered to ending the frame display corresponds to the rearranged valid line part, wherein a count of lines of the input image data is M, a line number of a position of a first line of the rearranged valid line part in the rearranged image data is N, a display refresh rate of the display panel is X Hz, both of M and X are larger than 1, the first delay control signal is delayed by (1/X)*((N−1)/M) seconds compared with a frame scan start signal of the frame display.

2. The display control method according to claim 1, wherein the rearranging the input image data to obtain the rearranged image data comprises:

performing the overall inversion rearrangement operation on the input image data to obtain the rearranged image data, wherein the first delay control signal is obtained according to a position of the rearranged valid line part in the rearranged image data, or the first delay control signal is obtained by presetting.

3. The display control method according to claim 1, further comprising:

acquiring a display control instruction; and selecting to perform the first display mode or to perform the second display mode in response to the display control instruction.

4. The display control method according to claim 3, wherein performing the second display mode comprises:

generating a second image display control signal corresponding to the input image data, wherein the second image display control signal is configured to perform a frame display corresponding to the input image data during the display operation; and outputting the input image data and the second image display control signal for performing the display operation on the display panel.

5. The display control method according to claim 3, wherein the acquiring the display control instruction comprises:

reading an input port of the display system and acquiring the display control instruction according to different states of the input port.

6. The display control method according to claim 5, wherein the selecting to perform the first display mode or to perform the second display mode in response to the display control instruction comprises:

selecting to execute the first executable code or the second executable code according to the display control instruction.

7. The display control method according to claim 3, wherein in the first display mode, the display panel is in an inverted state; and in the second display mode, the display panel is in an upright state relative to the inverted state, and the upright state is opposite to the inverted state.

8. The display control method according to claim 1, wherein the first delay control signal is configured to generate a scan start signal of the gate driving circuit.

9. The display control method according to claim 1, further comprising:

receiving and storing the input image data.

10. A display control device, comprising:

at least one memory, configured to store instructions; and at least one processer, configured to execute the instructions, so that the display control device executes a display control method, which comprises:

performing a first display mode or second display mode using an input image data, wherein performing the first display mode comprises:

rearranging the input image data to obtain a rearranged image data, wherein the input image data comprises a valid line part for actual display on a display panel and an invalid line part for non-actual display on the display panel, and the rearranged image data comprises a rearranged valid line part and a rearranged invalid line part corresponding to the valid line part and the invalid line part, respectively;

generating a first image display control signal and a first delay control signal corresponding to the rearranged image data; and outputting the rearranged image data, the first image display control signal, and the first delay control signal for performing a display operation on the display panel, wherein the first image display control signal is configured to perform a frame display corresponding to the rearranged image data during the display operation, and the first delay control signal is configured to trigger a line scanning process for the rearranged valid line part in the display panel during a process of the frame display, a position of the valid line part to be displayed on the display panel does not overlap with a position of the rearranged valid line part displayed on the display panel, a position of the invalid line part to be displayed on the display panel does not overlap with a position of the rearranged invalid line part displayed on the display panel, and the rearranged image data is obtained by performing an overall inversion rearrangement operation on the input image, so that the rearranged invalid line part of the rearranged image data is for non-actual display on the display panel, wherein the second display mode is different from the first display mode, wherein a display system to which the display panel belongs comprises a first executable code corresponding to the first display mode and a second executable code corresponding to the second display mode stored in a memory, and the second display mode is directly switched to the first display mode or the first display mode is directly switched to the second display mode by selecting to execute the first executable code or the second executable code; and the display panel comprises a gate driving circuit for implementing the line scanning process, the first executable code is configured to rearrange the input image data to obtain the rearranged image data and generate the first image display control signal and the first delay control signal corresponding to the rearranged image data, during the frame display, a time period before the first delay control signal is triggered corresponds to the rearranged invalid line part and the gate driving circuit does not output a gate scanning signal in the time period, and a time period from the first delay control signal being triggered to ending the frame display corresponds to the rearranged valid line part, wherein a count of lines of the input image data is M, a line number of a position of a first line of the rearranged valid line part in the rearranged image data is N, a display refresh rate of the display panel is X Hz, both of M and X are larger than 1, the first delay control signal is delayed by (1/X)*((N−1)/M) seconds compared with a frame scan start signal of the frame display.

11. The display control device according to claim 10, wherein the rearranging the input image data to obtain the rearranged image data comprises:

performing the overall inversion rearrangement operation on the input image data to obtain the rearranged image data, wherein the first delay control signal is obtained according to a position of the rearranged valid line part in the rearranged image data, or the first delay control signal is obtained by presetting.

12. The display control device according to claim 10, wherein the method further comprises:

acquiring a display control instruction; and selecting to perform the first display mode or to perform a second display mode in response to the display control instruction.

13. The display control device according to claim 12, wherein performing the second display mode comprises:

generating a second image display control signal corresponding to the input image data, wherein the second image display control signal is configured to perform the frame display corresponding to the input image data during the display operation; and outputting the input image data and the second image display control signal for performing the display operation on the display panel.

14. The display control device according to claim 10, wherein the acquiring the display control instruction comprises:

reading an input port of the display system; and acquiring the display control instruction according to different states of the input port.

15. The display control device according to claim 14, wherein the selecting to perform the first display mode or to perform the second display mode in response to the display control instruction comprises:

selecting to execute the first executable code or the second executable code according to the display control instruction.

16. The display control device according to claim 14, wherein, in the first display mode, the display panel is in an inverted state; and in the second display mode, the display panel is in an upright state relative to the inverted state, and the upright state is opposite to the inverted state.

17. The display control device according to claim 14, wherein the first delay control signal is configured to generate a scan start signal of the gate driving circuit.

18. The display control device according to claim 10, wherein the method further comprises:

receiving and storing the input image data.

19. A display device, comprising:

the display control device according to claim 10; and a display panel.

20. A display control method, comprising:

performing a first display mode or second display mode using an input image data, wherein performing the first display mode comprises:

rearranging the input image data to obtain a rearranged image data, wherein the input image data comprises a valid line part for actual display on a display panel and an invalid line part for non-actual display on the display panel, and the rearranged image data comprises a rearranged valid line part and a rearranged invalid line part corresponding to the valid line part and the invalid line part, respectively;

generating a first image display control signal and a first delay control signal corresponding to the rearranged image data; and outputting the rearranged image data, the first image display control signal, and the first delay control signal for performing a display operation on the display panel, wherein the first image display control signal is configured to perform a frame display corresponding to the rearranged image data during the display operation, and the first delay control signal is configured to trigger a line scanning process for the rearranged valid line part in the display panel during a process of the frame display, a position of the valid line part to be displayed on the display panel does not overlap with a position of the rearranged valid line part displayed on the display panel, and the rearranged image data is obtained by performing an overall inversion rearrangement operation on the input image, so that the rearranged invalid line part of the rearranged image data is for non-actual display on the display panel, wherein the second display mode is different from the first display mode, wherein a display system to which the display panel belongs comprises a first executable code corresponding to the first display mode and a second executable code corresponding to the second display mode stored in a memory and the second display mode is directly switched to the first display mode or the first display mode is directly switched to the second display mode by selecting to execute the first executable code or the second executable code; and the display panel comprises a gate driving circuit for implementing the line scanning process, the first executable code is configured to rearrange the input image data to obtain the rearranged image data and generate the first image display control signal and the first delay control signal corresponding to the rearranged image data, during the frame display, a time period before the first delay control signal is triggered corresponds to the rearranged invalid line part and the gate driving circuit does not output a gate scanning signal in the time period, the valid line part is located in the middle part of the input image data and invalid line parts are located on two opposite sides of the valid line part respectively.

* * * * *